Patented Apr. 1, 1941

2,236,590

UNITED STATES PATENT OFFICE 2,236,590

MATERIAL FOR IMPROVED ENGINE OPERATION

William J. Backoff, Norman D. Williams, John F. O'Loughlin, Harry L. Moir, and John S. Yule, Chicago, Ill., assignors to The Pure Oil Company, Chicago, Ill., a corporation of Ohio No Drawing. Application October 31, 1938, Serial No. 237,940

15 Claims. (Cl. 44—9)

This invention relates to certain new and useful improvements in engine fuels, particularly to fuels to be used in internal combustion engines as, for example, automotive engines.

In the operation of internal combustion engines there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit causes what is commonly known as knocking of the fuel charge in the cylinders. Similar deposits cause the piston rings and valves to stick. This deposit is commonly referred to as carbon although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposition, but undoubtedly also accounts for a deposit of gum-like material as well, which under the prevailing conditions may be in a form ranging from a fairly soft gum to a hard, brittle varnish-like substance. For purposes of convenience, the deposits of materials in internal combustion engines, described in the foregoing paragraph, will be referred to as carbon deposits.

It has also been noted that motor fuels composed largely of cracked petroleum hydrocarbons, such as the usual gasolines now on the market, form a deposit of a gum-like residue in the intake system of internal combustion engines. This deposit is usually most noticeable in the intake manifold and around the intake valves and is generally referred to as gum. This deposition of gum is very objectionable and may be the cause of the improper functioning, or failure to function, of the intake valves whereby the operating efficiency is materially impaired.

It is an object of this invention to provide a composition which is adapted to be used in conjunction with gasoline or other fuels in internal combustion engines to remove and/or prevent deposits of the nature of carbon and/or gum.

Another object of this invention is to provide a motor fuel which will, when used in internal combustion engines, result in a material improvement in the efficiency of the operation of the engine.

Further objects of our invention will appear from the following description of the invention.

It is known that a number of substances have been used in the past with some degree of success to remove or prevent deposits of carbon and gum in internal combustion engines. As a result of laboratory investigation and of commercial usage, it has been found that the materials now in use fail to effectively remove the deposits from either the intake system or the combustion zone. These materials, although possibly producing a slight improvement in engine operating conditions, are unsatisfactory for the reason that removal or prevention of carbon deposits and gum in both the intake and combustion system is not effected.

In an effort to overcome the deficiencies of the earlier carbon and gum removing agents, frequently referred to as solvents, resort was had to those materials which had a stronger and more powerful action, such as halogenated organic compounds. This frequently resulted in the use of materials which caused corrosion of engine parts which, of course, was highly undesirable. The effect of simply increasing the amount of solvent additive has also been tried but this change generally results in increasing the deposit in the combustion zone, apparently as a result of carbonization of the solvent itself or as a result of the effect of the solvent action in the intake system causing removal of the deposit there, and the carrying of the deposit into the combustion zone where, due to the difference in conditions, such as temperature and pressure, deposition of material resulted and the deposit in the combustion zone increased.

We have now discovered that certain combinations of materials, when used in definite propoitions in motor fuel, will remove carbon and gum deposits already present and will inhibit or prevent the further deposition of carbon and gum in both the intake system and combustion zone. While the nature of the solvent effect of the proposed combinations is such as to be classed as very active, under the conditions which they are used, yet the materials are non-corrosive and do not injure in any way the metal parts with which they come in contact. The particular materials which compose the product in accordance with this invention are: (1) a high boiling fatty acid ester having a boiling point over 500° F., for example, butyl oleate, octyl stearate, butyl stearate, amyl stearate, amyl oleate, various laurates and palmitates, etc.; (2) one or more compounds boiling over 350° F. having gum solvent properties and selected from the group consisting of esters of aliphatic dicarboxylic acids, esters of aromatic acids, cyclic including aromatic ketones and aliphatic alcohols. Examples of this group are methyl phthalate, amyl phthalate, benzyl benzoate, ethyl benzoate, dibutyl phthalate, butyl tartrate, butyl benzoate, benzophenone, acetophenone, furfuralacetone and octyl alcohol. The proportions of the various compounds indicated which may be used in such combinations of solvent materials must, for satisfactory results, be maintained within certain definite ratios but may be varied within the limits of approximately 50% to 90% of high boiling fatty acid ester boiling over 500° F. and 10% to 50% of one or more compounds from group 2. It is only by maintaining the compositions between these limits that effective diminution or prevention of deposits in both the combustion and intake system may be accomplished.

The composition is preferably used in admixture with motor fuel although it may be separately injected into the motor. It has been found advantageous to periodically, for example, every thousand miles, add solvent mixture in amounts indicated below through the carburetor. For every 40 to 50 cubic inches of piston displacement, one to two ounces of a preferred solvent combination may be injected into the carburetor or intake manifold. This treatment readily frees the intake system of accumulated gum and carbon deposits and results in freer valve action and higher operating efficiency. Furthermore, the injection of a preferred solvent in the proportion mentioned results in the loosening of the combustion chamber deposits and piston ring deposits so that these deposits are readily removed when the engine is operated under normal driving conditions. The quantity of such mixture, which, when added to motor fuel, is necessary to effectively remove and/or prevent carbon and gum deposits may vary considerably depending on the type of engine, condition of engine, the particular fuel employed, and the operating conditions encountered. The amount of solvent additive used must be accurately determined by well known engine efficiency tests, the engines of lowest efficiency usually requiring the greatest amounts of solvent. It has been found by experiment that in some cases deviation from the proportions specified noticeably diminishes the efficacy of the solvents as indicated by an increase in the deposit in the combustion zone. Generally, a maximum of 5% and usually not over 1% of solvent based on the volume of motor fuel, is sufficient. In general, it has been found that from 0.1% to 0.5% gives satisfactory results.

The following tabulation of data indicates the nature of the results obtained by the use of combinations of solvents within the scope of our invention:

| | Oil free deposit in combustion chamber | Deposit in intake system | Total deposit |
|---|---|---|---|
| | Grams | | |
| 1 Blank | 76.6 | 11.0 | 87.6 |
| 2 0.4% {90% butyl stearate, 10% dibutyl phthalate} | 70.9 | 4.6 | 75.5 |
| 3 Blank | 34.2 | 16.2 | 50.4 |
| 4 0.2% {80% butyl stearate, 10% dibutyl phthalate, 10% ethyl benzoate} | 29.1 | 6.3 | 35.4 |

The above tests were made on stock motors mounted on a test block and connected to a dynamometer. A pre-gummed gasoline containing 10 mg. of gum by ASTM test D381-36 was used as a fuel. A blank run was made in which all conditions were identical with the conditions of the subsequent test run except the addition of the solvent to the fuel.

The figures shown are in grams of deposit obtained from the combustion chamber and intake systems. The intake system deposit comprised all material found up to and including the intake side of the intake valves. The deposits in all cases were carefully scraped from the engine parts until the metal was bare, and were then collected and weighed. In the case of the combustion chamber deposits the material was carefully washed with light petroleum fractions to eliminate irregularities due to varying amounts of oil present in the deposits.

Although the data indicate to some extent the improvement in engine conditions effected, the full extent of the beneficial results obtained can only be completely appreciated when considered together with visual appearance of the intake and combustion areas and motor performance. Photographs taken of the affected areas of the engine, after blank runs and after runs made with fuel containing solvent show that the combustion zone especially in the cooler portions, was conspicuously improved both as to a reduction in quantity and as to character of deposit. The deposit instead of being hard and of such a nature as would ultimately seriously interfere with engine operations, the deposit was not only reduced in quantity but was soft and friable and parts of the metal were entirely bare indicating that after a small amount of deposit accumulated it did not adhere to the metal and consequently passed out of the motor in the exhaust gases. A great improvement in the condition of the intake system was also apparent from a visual inspection of the areas generally affected, particularly the intake valve ports and stems. On the blank runs the instake valve stems and guides were coated with a deposit of such a nature as to materially interfere with lubrication and to cause sticking. This condition was not present in those runs in which the solvents were used. It was also observed during the course of laboratory tests, that the engines ran much quieter when operating on a fuel which contained the carbon and gum solvent. It has been observed that the octane number of the fuel necessary to produce a given standard of performance has been lowered as a result of the use of the solvent in the fuel.

Although the use of the solvent in admixture with motor fuel has been more particularly described, it is to be understood that the constituents comprising the solvent may be injected directly into the motor without previous admixture with fuel. For example, the solvent or the constituents thereof may be placed in the carburetor or injected into the head of the motor through the spark plug openings. In such cases approximately one to two ounces of solvent per cylinder may be used. It is advantageous to inject solvent periodically, for example, every thousand miles, into the motor in conjunction with the regular use of the solvent in the fuel and thereby take care of the removal of any deposits they may collect from time to time.

The solvent is also useful in admixture with lubricating oil both for use in internal combustion engines and industrial machinery. When admixed with lubricating oil, the solvent should be used in amounts of 1% to 5% by volume of the oil. When used with motor oils, deposits of carbon on piston rings is largely removed and minimized. When used in industrial lubricating oils, for example, for use in lubricating spindles, gum deposition is largely avoided.

The foregoing general description of the invention (and the specific examples described) is sufficient to enable one skilled in the art to appreciate its value. The invention is not limited to the specific examples disclosed or to any particular theory or mechanism of the action of the gasoline additive but is to be interpreted as broadly as the prior art permits in view of the following claims.

What we claim is:

1. A composition to be used in conjunction with motor fuels comprising 50% to 90% of fatty acid ester boiling over 500° F. and 50% to 10% of ester of aromatic acid boiling above 350° F. and having gum solvent properties at elevated temperature.

2. A composition according to claim 1 where the ester of aromatic acid boiling over 350° F. and having gum solvent properties at elevated temperature is dibutyl phthalate.

3. A composition according to claim 1 where the esters of aromatic acid boiling over 350° F. and having gum solvent properties at elevated temperature are dibutyl phthalate and ethyl benzoate.

4. A composition to be used in conjunction with motor fuels comprising 90% butyl stearate and 10% dibutyl phthalate.

5. A composition to be used in conjunction with motor fuels comprising 80% butyl stearate, 10% dibutyl phthalate and 10% ethyl benzoate.

6. A composition according to claim 1 where the fatty acid ester is alkyl ester.

7. A composition according to claim 1 where the fatty acid ester and ester of aromatic acid are alkyl esters.

8. The method of preventing and removing gum and/or carbon deposits from internal combustion engines which comprises contacting said deposits with a composition containing the following ingredients in the following proportions by volume:

Per cent
(a) Fatty acid ester boiling over 500° F____ 50–90
(b) Ester of aromatic acid boiling over 350°
      F. and having gum solvent properties
      at elevated temperature_____ 50–10

9. Method in accordance with claim 8 where the fatty acid ester is butyl stearate and the ester of aromatic acid is selected from the group consisting of dibutyl phthalate and ethyl benzoate.

10. A hydrocarbon motor fuel containing from .1 to 5% of a mixture composed of 50–90% of fatty acid ester boiling over 500° F. and 50–10% of ester of aromatic acid boiling above 350° F. and having gum solvent properties at elevated temperature.

11. A motor fuel for internal combustion engines comprising a major portion of hydrocarbons of suitable boiling range and between .1 and 1% of a mixture consisting of 90% butyl stearate and 10% dibutyl phthalate.

12. A motor fuel for internal combustion engines comprising a major portion of hydrocarbons of suitable boiling range and between .1 and 1% of a mixture consisting of 80% butyl stearate, 10% dibutyl phthalate and 10% ethyl benzoate.

13. Motor fuel in accordance with claim 10 where fatty acid ester is an ester of stearic acid and ester of aromatic acid is an ester of a dibasic acid.

14. A motor fuel in accordance with claim 10 where the fatty acid ester and ester of aromatic acid are alkyl esters.

15. Method in accordance with claim 8 where the fatty acid ester and ester of aromatic acid are alkyl esters.

WILLIAM J. BACKOFF.
NORMAN D. WILLIAMS.
JOHN F. O'LOUGHLIN.
HARRY L. MOIR.
JOHN S. YULE.